United States Patent
Zucker et al.

(10) Patent No.: US 10,471,532 B2
(45) Date of Patent: Nov. 12, 2019

(54) SYSTEM AND METHOD OF COMMUNICATING IN A WELDING SYSTEM OVER WELDING POWER CABLES

(71) Applicant: LINCOLN GLOBAL, INC., City of Industry, CA (US)

(72) Inventors: James P Zucker, Aurora, OH (US); Alexander Craig Mehlman, Lakewood, OH (US); Nicholas Uguccini, Stow, OH (US); Mike Volzer, Fairport Harbor, OH (US); Nicholas Trinnes, Willoughby, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 60 days.

(21) Appl. No.: 15/294,653

(22) Filed: Oct. 14, 2016

(65) Prior Publication Data
US 2017/0120364 A1    May 4, 2017

Related U.S. Application Data

(60) Provisional application No. 62/248,034, filed on Oct. 29, 2015.

(51) Int. Cl.
*B23K 9/09* (2006.01)
*B23K 9/095* (2006.01)
*B23K 9/10* (2006.01)

(52) U.S. Cl.
CPC ............ *B23K 9/0953* (2013.01); *B23K 9/091* (2013.01); *B23K 9/1043* (2013.01); *B23K 9/1087* (2013.01)

(58) Field of Classification Search
None
See application file for complete search history.

(56) References Cited

U.S. PATENT DOCUMENTS

| 4,114,024 | A | * | 9/1978 | Donner | G05D 23/1902 |
| | | | | | 219/489 |
| 5,982,253 | A | * | 11/1999 | Perrin | H01R 13/719 |
| | | | | | 333/182 |
| 6,104,308 | A | | 8/2000 | Wallace et al. | |

(Continued)

FOREIGN PATENT DOCUMENTS

| DE | 19829842 A1 | 1/1999 |
| EP | 1500456 A1 | 1/2005 |

OTHER PUBLICATIONS

European Search Report dated Apr. 12, 2017 for European Application No. 16002289.3-1702/3165316.

(Continued)

*Primary Examiner* — Ibrahime A Abraham
*Assistant Examiner* — Gyounghyun Bae
(74) *Attorney, Agent, or Firm* — David J. Muzilla

(57) ABSTRACT

Systems and methods of the present invention are directed to welding systems having a welding power supply and wire feeder, where the power supply and wire feeder communicate over the welding power cables. In exemplary embodiments, the wire feeder communicates with the power supply over the welding cables using current draw pulses which are generated and recognized by the power supply. Similarly, the power supply generates voltage pulses which are transmitted over the welding power cables and recognized by the wire feeder.

20 Claims, 9 Drawing Sheets

(56) References Cited

U.S. PATENT DOCUMENTS

| | | | | |
|---|---|---|---|---|
| 6,188,314 B1* | 2/2001 | Wallace | .................. | B60R 16/03 307/38 |
| 6,278,357 B1* | 8/2001 | Croushore | ............... | H04B 3/54 340/534 |
| 6,570,132 B1 | 5/2003 | Brunner | | |
| 6,583,386 B1* | 6/2003 | Ivkovich | .............. | B23K 9/0953 219/125.1 |
| 6,744,820 B1* | 6/2004 | Khairallah | ............. | B60R 21/01 340/438 |
| 6,906,618 B2* | 6/2005 | Hair, III | ................... | H04B 3/54 340/12.37 |
| 7,084,741 B2* | 8/2006 | Plummer | ................. | H04B 3/54 340/12.32 |
| 7,116,962 B2* | 10/2006 | Tazaki | ................... | H04B 3/548 455/297 |
| 7,180,029 B2* | 2/2007 | Ott | ....................... | B23K 9/1087 219/132 |
| 7,205,503 B2* | 4/2007 | Reynolds | ............ | B23K 9/1087 219/132 |
| 7,624,908 B2* | 12/2009 | Enyedy | ................ | B23K 9/1336 219/137.71 |
| 8,592,722 B2* | 11/2013 | Ulrich | .................. | B23K 9/0953 219/130.5 |
| 9,076,357 B2* | 7/2015 | Hussain | ............. | H05B 33/0827 |
| 9,496,793 B2* | 11/2016 | Bruwer | ................... | H02M 1/36 |
| 9,878,395 B2* | 1/2018 | Salsich | ................. | B23K 9/067 |
| 2006/0138113 A1 | 6/2006 | Ott et al. | | |
| 2007/0080154 A1 | 4/2007 | Ott et al. | | |
| 2009/0230098 A1* | 9/2009 | Salsich | .................. | B23K 10/00 219/121.54 |
| 2011/0056923 A1* | 3/2011 | Aberg | ................. | B23K 9/1062 219/130.32 |
| 2013/0277351 A1* | 10/2013 | Lamesch | ................ | B60N 2/002 219/202 |
| 2013/0327748 A1* | 12/2013 | Salsich | ................ | B23K 9/1006 219/130.21 |
| 2014/0048522 A1* | 2/2014 | Dina | .................... | B23K 9/0953 219/132 |
| 2015/0283639 A1* | 10/2015 | Henry | ................ | B23K 35/3053 219/130.51 |
| 2016/0175969 A1* | 6/2016 | Denis | ................... | B23K 9/0953 219/130.21 |

OTHER PUBLICATIONS

Partial European Search Report dated Apr. 18, 2017 for European Application No. 16002291.9-1702.
European Search Report E1160264EP dated Apr. 12, 2017 for European Application No. 16002288.5-1702/3165315.
European Search Report E1160266EP dated Apr. 12, 2017 for European Application No. 16002290.1-1701/3165317.
Extended European Search Report from Corresponding Application No. EP16002291.9; dated Sep. 13, 2017.

* cited by examiner

SYSTEM AND METHOD OF COMMUNICATING IN A WELDING SYSTEM OVER WELDING POWER CABLES

PRIORITY

The present application claims priority to U.S. Provisional Patent Application No. 62/248,034 filed on Oct. 29, 2015, the entire disclosure of which is incorporated herein by reference.

FIELD OF THE INVENTION

Devices, systems, and methods consistent with the invention relate to data communication in welding systems, and more specifically related to data communication over welding cables.

BACKGROUND OF INVENTION

As welding technology and applications have advanced so have the demands on power supply sources and welding systems. These demands have increased with the increased use of welding systems in more rugged environments. In traditional welding systems the welding power supply communicates with the wire feeder via dedicated communication cables. However, these communication cables are susceptible to damage, especially in these rugged environments. Further, the communications add cost and complexity to the welding system and can limited the positioning of the wire feeder relative to the power supply. Efforts have been made to allow for system communication over the power cables, but these efforts use complex communication protocols which can be complex and vulnerable to interference and other issues.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

Embodiments of the present invention include employing welding cables that facilitate bi-directional data communications between a wire feeder and a power supply. The circuitry included inside the wire feeder and the power supply allow for such communications to take place before, after and/or concurrently with transfer of welding power signals. Communication modules included within the wire feeder and the power supply allow for communication using current and voltage pulses over the welding signal cables and do not require the use of complex communication protocols.

In further exemplary embodiments, a method is provided which comprises receiving continuously worksite voltage measurement data of voltage at a welding electrode, the worksite voltage measurement data is communicated across the arc using a welding cable and comparing continuously the worksite voltage measurement data to a welding output voltage at the welding power supply to identify a voltage difference. The method also includes increasing or decreasing the welding output voltage using the welding power supply based at least in part on the voltage difference.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
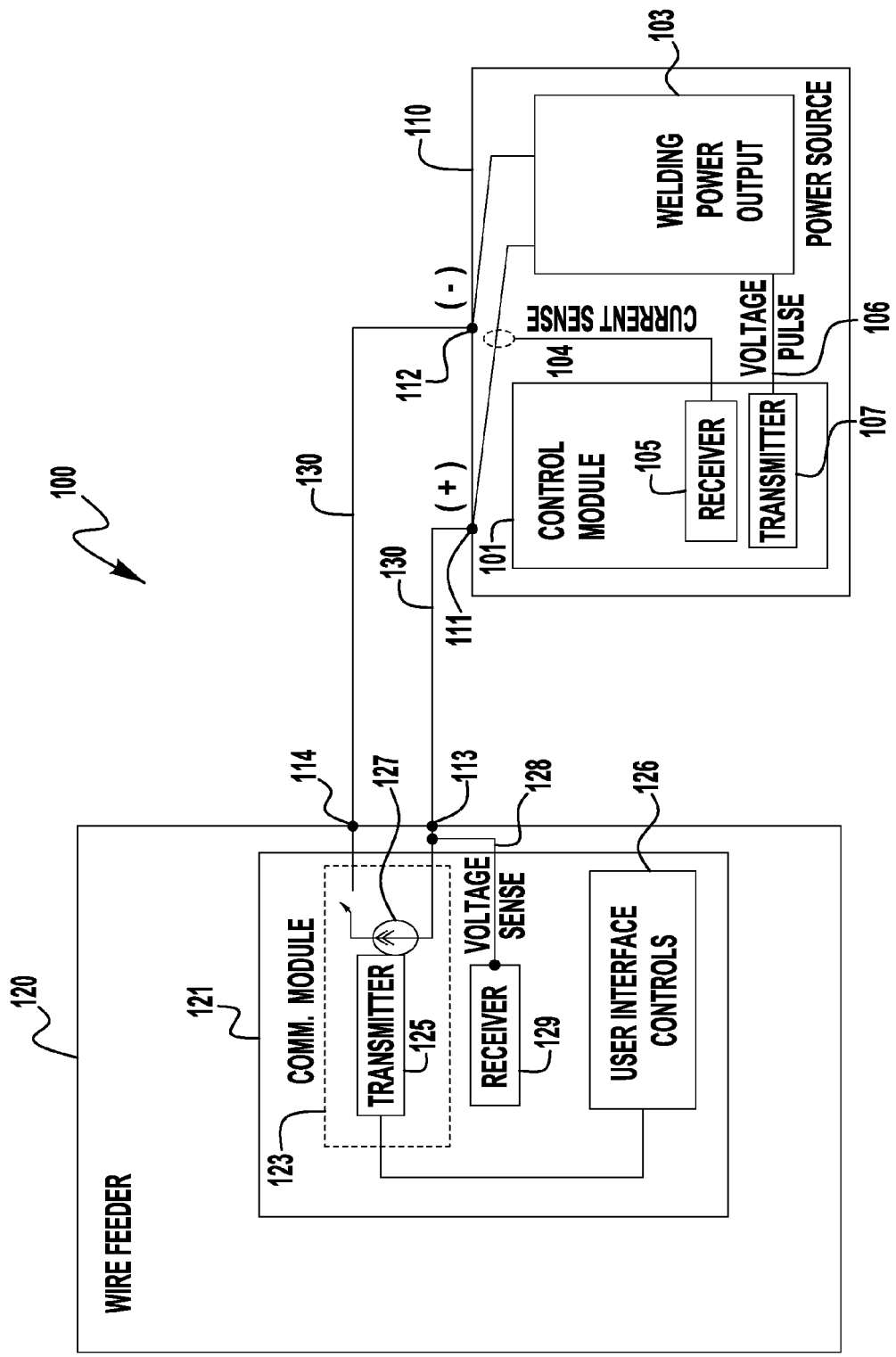
FIG. 1 illustrates a diagrammatical representation of an overall welding system in accordance with an exemplary embodiment of the present invention.

Turning now to the figures of the present application, FIG. 1 depicts an exemplary welding system 100 in accordance with an embodiment of the present invention. The welding system 100 can be any known type of welding system which employs a welding power supply and a wire feeder coupled to the power supply. For example, the welding system can be a MIG type welding system. The embodiments discussed below will generally be described as a MIG welding system, but this is intended to be only exemplary, as embodiments of the preset invention can be employed in other types of welding systems. Because MIG type welding systems are well known, the coupling of the system (e.g., wire feeder) to the welding torch and workpiece is not shown for clarity. That aspect of the embodiments of the present invention are not changed and thus need not be shown or discussed in detail herein. In further exemplary embodiments, the system can include a remote control and/or a pendant control device (which are generally known) which utilizes the communication methodologies discussion herein. That is, for example, the remote/pendant can utilize the across the arc communication protocols discussed herein and otherwise detect the signals being sent by any one of the wire feeder or power supply and communicate those signals to a user. In other embodiments the pendant/remote controller takes the place of the wire feeder in the systems described herein and the functionality described below in the wire feeder would be present in the pendant/remote control, using similar communication protocols as described herein. For example, in a stick or TIG welding system the remote would be used instead of the wire feeder and the remote will be coupled to the power supply and communicate as described herein. It further should be noted that while the exemplary embodiments described herein are described as welding systems, embodiments of the present invention can also be used in other systems, such as plasma cutting, etc., and as an extension, other components can be used, instead of a wire feeder and welding power supply as described herein. That is, the power supply can be a cutting power supply, power generator with a load, etc. The systems are described herein as welding for simplification and efficiency, but embodiments herein are not limited thereto. Further, the communication circuitry, systems, methods and protocols described herein can be incorporated into these types of other systems by those of skill in the art.

Turning now to the system 100, as is typical, the system 100 contains a power supply 110 coupled to a wire feeder 120 via welding cables 130. The power supply 110 can be configured like known welding power supplies, with the additional features and attributes discussed herein. For example, in embodiments of the present invention, the power supply 110 can be configured like the Flextec® welding systems manufactured by The Lincoln Electric Co. of Cleveland, Ohio. Further, the wire feeder 120 can be configured like known wire feeders, with the additions discussed herein, an example of which is the LN-25 series wire feeders manufactured by The Lincoln Electric Company of Cleveland, Ohio. Of course other power supplies and wire feeders can be used and these references are intended to be merely exemplary.

As is general known, the power supply 110 outputs a welding current, which is directed to the wire feeder 120, via the cables 130, so that the wire feeder can pass the current on to a welding electrode for welding a workpiece. In a MIG system the electrode is also the consumable, and in other processes, such as TIG, the electrode is not the consumable deposited into the weld. The cables 130 are the main welding power cables which deliver the welding power/current from the output studs 111/112 of the power supply 110 to the wire feeder 120. As with known systems, the wire feeder 120 and the power supply 110 can communicate with each other both prior to, after and during welding. Often these communications are related to welding parameters, set points, feedback, etc. As explained previously in known systems, the welding systems use dedicated communication cables/lines between the power supply 110 and the wire feeder 120. Embodiments of the present invention eliminate the need for these additional communication cables and provide a robust communication system/process between the wire feeder and power supply.

As described further below, in addition to being able to carry the welding current/power the welding cables 130 are designed to carry data communications (e.g., control commands) between the power supply 110 and the wire feeder 120. Embodiments of the present invention support unidirectional as well as bi-directional communication between the wire feeder 120 and the power supply 110. Accordingly, the power supply and the wire feeder both transmit/receive signals and/or data with respect to each other over the cables 130.

As is generally understood, the power supply 110 receives an AC signal as its input (not shown in FIG. 1). The AC signal can be received as a 3-phase input, or a single phase AC input signal. The AC signal can vary in voltage and frequency depending on the source of power and/or the country of operation. For example, the AC input can be from a utility grid—which can range from 100 to 660 volts at 50 or 60 Hz—or can be from a portable generator, which can also have a varying voltage and frequency. Thus, the system 100 is capable of operating properly and providing a welding or cutting signal regardless of the input AC voltage magnitude, phase type and frequency. The power supply 110 is designed to run in various modes including constant voltage (CV) and constant current (CC) modes, as suitable in various applications. Thus, the power supply 110 can include additional electrical components to condition the raw AC signal received and output the desired welding signal.

In most exemplary embodiments, the power from the power supply 110 is suitable for welding and is transmitted to the wire feeder 120 via the welding cables 130—which are large diameter electrical conduits. Thus, in exemplary embodiments of the present invention, the welding signal (i.e., the current signal sent to the contact tip that is actually used for welding) is originally generated, controlled and modified within the power supply 110, and then communicated via welding cables 130 to the wire feeder 120. In addition to feeding a welding electrode, the wire feeder 120 passes on the received welding signal to the arc using cables (not shown).

In traditional welding systems, sense leads are often used to sense a voltage of the welding arc to allow for proper control of the welding operation. The sense leads are electrically coupled to the workpiece and the contact tip to provide feedback regarding the voltage of the arc. This feedback is used by the power supply 110 to control the creation and output of the welding signal. For example, the sense leads would be used to detect a short circuit event and the power supply 110 would output a signal which allows for the short to be cleared. The sense leads are not shown in the figures for clarity, but their use is well known and need not be further described herein.

For example, it is noted that in some applications, the wire feeder 120 is positioned a significant distance from the power supply 110, thus requiring the cables 130, and any other data carrying or sense lead cables, to be quite long. This often occurs when the welding operation is not conducive to having the power supply 110 close to the welding operation, but the wire feeder 120 is positioned close by to ensure proper wire feeding. These long cables (especially the welding power cables 130) can greatly increase the overall system inductance during a welding operation. This increase in impedance can be a detriment to the welding operation because it can adversely affect the overall responsiveness of the welding power supply 110. This is particularly problematic in pulse welding operations. Therefore, it is desirable to reduce the overall system impedance as much as possible. Further, separate control cables are typically used to connect the power supply and the wire feeder. These are prone to damage and other limitations, because of their length.

With embodiments of the present invention, the power supply 110 and the wire feeder 120 can be placed apart from each other by very large distances, whereas with traditional welding systems there exists a maximum effective distance between the welding power supply and the wire feeder. For example, traditional systems should not have more than 100 feet in between the power supply and the wire feeder. However, with embodiments of the present invention, that distance can be greatly exceeded. In fact, the components 110 and 120 can be separated from each other by a distance in the range of 100 to 500 feet. In other exemplary embodiments the distance is in the range of 250 to 500 feet.

As briefly mentioned above, efforts have been made to address some of the issues by communicating over the power cables 130 by super-imposing a communication signal over a welding signal. However, this can have some severe drawbacks as the communication signal can interfere with, or otherwise comprise the welding signal, and can require complex communication control. However, as explained in detail below, these issues are not present with embodiments of the present communication system. That is, rather than overlaying a communication signal, embodiments of the present invention utilize a regulated/controlled power draw protocol to communicate between the wire feeder and the power supply. This is further explained below.

As shown in FIG. 1, the power supply 110 contains a welding power output module 103 which generates and outputs the welding power signal to the wire feeder. The welding output module can be constructed consistent with known systems, and can contain (for example), a rectifier, a buck, boost or buck-boost circuit to generate a regulated DC bus and an output circuit, such as a chopper, PWM, inverter, etc. which is used to generate the welding signal. Of course, other known output circuits/configurations can also be used without departing from the spirit or scope of the present invention. This output module can be controlled consistent with known systems. The power supply 110 also contains a control module 101 which can be used to control the operation of the output module 103 and the power supply 110. The control module can contain a processor based computing system containing a memory, processor, etc. to control the operation of the power supply 110 consistent with known systems. Further, the control module 101 contains a receiver 105 and a transmitter 107 to facilitate communication with the wire feeder 120 consistent with the embodiments discussed herein. As shown, the receiver 105 is coupled to at least one output line of the output module 103 with a current sense lead 104 to sense an output current of the output module 103. Further, the control module 101 contains a transmitter 107 which is used facilitate the transmission of a data signal from the power supply to the wire feeder 120. The transmitter 107 is coupled to the output power module 103 via a voltage signal lead 106—the use of which will be explained further below. Of course, the power source 110 also contains additional components and electronics, such as input controls, auxiliary power, etc. which are not shown for clarity. However, as these aspects of power supplies are well known they need not be discussed in detail herein.

Further, as shown, the wire feeder 120 contains a controller module 121 which is used to facilitate communication with the power supply 110. The controller module 121 contains/is coupled to a user interface control board 126 which allows a user to input user/welding data to the wire feeder 120 to control operation of the system 100. The user interface 126 can be configured like any known user interface, and can include a data screen (LED, etc.) user controls (knobs, buttons, etc.) and/or a touch sensitive input screen. Any known user interface configuration can be utilized. In some embodiments, the user interface controls 126 need not be a part of the communication module, but the user input is at least coupled to the communication module to allow for the user input data to be communicated as discussed herein. The controller module 121 also includes a receiver 129 which is coupled to one of the wire feeder studs 113/114 which are coupled to one of the welding power lines 130 via a voltage sense lead 128. (While only one sense lead is shown, sense leads to each of the studs can be used to detect voltage at the studs). As explained further below, the voltage sense lead 128 is used to sense a voltage communication signal from the power supply 110. The controller module 121 also contains a communication module 123 having a transmitter 125 and a current sink circuit 127 which is used to vary the current draw in the wire feeder 120 to facilitate communication with the power supply 110. This is explained further below. Of course, the wire feeder 120 can have other systems and components, such as motors, motor controls, etc. which are known and need not be shown or described for clarity. The controller module 121 can also have a processor, memory, etc. consistent with known controller modules to ensure the proper operation of the wire feeder 120.

As state above, some systems have been developed which utilize a complex communication signal over the power cables 130. Embodiments of the present invention do not use this ideology, but instead vary the current/power draw to facilitate communication. Embodiments of the present invention are discussed below, in the context of an exemplary communication sequence. However, it should be noted that in the following exemplary sequence/embodiment the communication sequence begins at the wire feeder 120, but embodiments are not limited in this way as the power supply 110 can initiate communications consistent with embodiments described herein.

As is generally known, the wire feeder 120 can receive its control and operational power from the power supply 110 via the cables 110. This operational power can be in the form of output voltage from the power supply 110 having an OCV voltage of about 60 volts (for example), and a power of about 50 watts (for example). (It is noted that while the power signal is referred to as an OCV signal, there is some current flowing due to the fact that the power signal from the power supply 110 is being used to power the auxiliary circuits in the wire feeder). When the wire feeder 120 is powered up, it can receive user inputs via the user interface controls 126. These user inputs are communicated to the communication module 123 and the transmitter 125 which causes the current sink circuit to vary the current draw by the wire feeder 120 from the power signal from the power supply 110. That is, rather than sending a communication signal using a known communication protocol, the current sink circuit 127 varies the current draw of the wire feeder 120 so that the power supply 110 "sees" or senses the changes in the current draw—via the current sense lead 104 and receiver 105, and interprets these changes in the current draw as a data communication signal.

Figure 2:
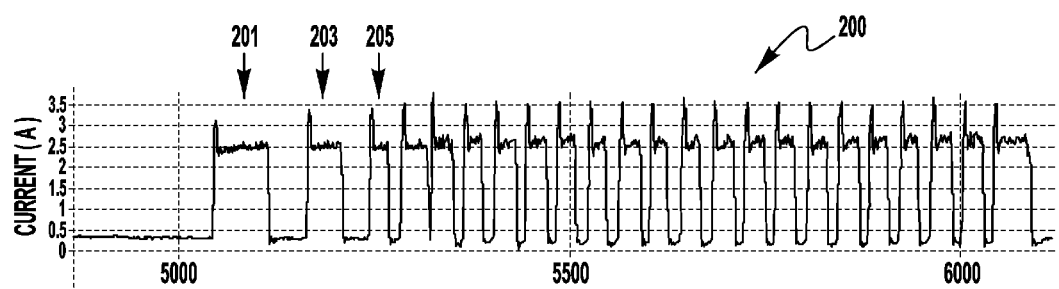
FIG. 2 illustrates a diagrammatical representation of an exemplary current signal communication waveform to be used by an exemplary embodiment of the present invention.

An exemplary current draw communication signal is represented in FIG. 2. FIG. 2 shows a current signal 200 having a low OCV current draw (below 0.5 amps) when no communications are being made and the power supply 110 is simply powering the wire feeder 120. However, when the wire feeder 120 wants to communicate with the power supply 110—to communicate user input settings for example—the wire feeder uses the current sink circuit 127 to vary the current draw from the power signal in a series of pulses as shown in the waveform 200. As shown in this exemplary embodiment, the current sink circuit 127 causes the current draw from the power supply to pulse to a peak level of about 2.5 amps in a series of pulses which are recognized by the power supply 110 (sensing the changes in current draw) as a data signal from the wire feeder 120. The wire feeder 120 uses these current draw pulses as a means to communicate data. Thus, unlike known communication systems, the wire feeder 120 does not generate a communication signal that is transmitted to the power supply (using various known communication protocols) but instead varies the current draw in a predetermined format/pattern which is seen by the power supply as a data signal. This is a more robust and stable communication protocol.

For example, in the exemplary embodiment shown, the communication module 123/current sink circuit 127 causes a message start current pulse 201 to be initiated. For this pulse (and subsequent pulses) the current sink circuit 127 switches to create a current path which causes the desired additional current to be drawn from the power signal to create the pulse 201. This signal start current draw pulse 201 has a predetermined pulse width and/or peak current which is known by the power supply 110 as a signal start pulse. For example, as shown, the signal start pulse 201 has a pulse width of 3 ms and a peak current of about 2.5 amps. Thus, when this current draw is sensed by the power supply 110, the power supply 110 control module 101 recognizes that data is to be transmitted from the wire feeder to the power supply. Following the signal start pulse 201 a series of current draw pulses 203/205 are created by the current sink circuit 127 and are sensed by the power supply 110. The pulses 203/205 can represent a binary code ("1"s and "0"s) which are recognized by the control module 101 of the power supply 110, such that the control module 101 interprets/uses these current draw pulses to receive the data message from the wire feeder 120. For example, the power supply 110 can use this message to provide the desired welding signal for a given welding operation. As shown, the data pulses 203/205 can have a different pulse width and/or peak current so as to provide the desired binary code. In the embodiment shown, the pulses have the same peak current, but their pulse width is varied, where one data pulse 203 has a large pulse width than the other data pulse 205. Using this binary pulse methodology a binary signal can be sent to the power supply 110 from the wire feeder 120 using nothing more than varying current draw at the wire feeder. In some exemplary embodiments, a signal end current draw pulse (not shown) can be created by the circuit 127 to signal the end of a data transmission to the power supply. For example, the signal end pulse can be the same as the signal start pulse 201, but because it is received second it is recognized as a signal end pulse. In other embodiments, the signal end pulse can have a different peak current and/or pulse width which is recognized at the power supply as a signal end pulse. In a further exemplary embodiment, the receiver 105 and/or the control module 101 can have a predetermined bit size for a packet of information from the wire feeder, and when the appropriate amount of information (e.g., bits) is received from the wire feeder 120 the control module 101 determines that a full packet has been sent and then processes that packet and awaits for a further signal start pulse 201. In such an embodiment, a signal end pulse is not needed. Further, in additional embodiments the signal start and/or end may not be a single pulse, but can be two or more pulses of the same type—which is used to signal the beginning and/or end of a data packet. For example, embodiments can use two identical data pulses having certain pulse characteristics to signify the beginning of a data message.

The current draw pulses 201/203/205 utilized by embodiments of the present invention can have any predetermined pulse width/peak current so long as each of the power supply 110 and wire feeder 120 each recognize the pulse data. For example, the pulses can have a peak current in the range of 0.25 to 5 amps, and can have a pulse width in the range of 0.05 to 100 ms so long as the various pulses 201/203/205 are sufficiently distinguishable from each other so as to be properly recognized by the power supply 110. In further exemplary embodiments, the pulse widths can be in the range of 0.5 to 5 ms, 1 to 3 ms. For example, in an exemplary embodiment the signal start pulse 201 can have a pulse width of 3 ms, whereas the data pulses 203 and 205 can have pulse widths of 2 ms and 1 ms, respectively. These pulses can have the same peak current, or can have different peak currents in different exemplary embodiments. In exemplary embodiments, the peak currents of the respective pulse can be in the range of 1 to 5 amps. In further exemplary embodiments, the peak currents for the pulses can be in the range of 2 to 4 amps. In exemplary embodiments, the current draw signal can have a frequency in the range of 10 Hz to 10 kHz, while in other embodiments the range can be 100 Hz to 500 Hz. Of course, embodiments are not limited to these parameters and other pulse widths, peak currents and frequencies can be used so long as the communication protocol is recognizable by the power supply 110. In other exemplary embodiments, the duration of the peak current of the pulses can be altered to distinguish between the different pulses, for communication purposes. That is, in such embodiments, the pulse width of each of the pulses is the same, but the duration of the peak value of the different pulses is different, and this differential is used by the power supply 110 to recognize the different pulses. Any number of different pulse types can be used to communicate data, where the pulses have different peaks and/or widths to distinguish the pulses so long as they are recognizable by the power supply. Further, the pulse period or frequency can be used to differentiate pulse for data transmission.

However, it should be noted that because the current sink circuit 127 is drawing current from the OCV signal, the drawn power needs to be dissipated within the wire feeder 120. This can be done with the use of resistors, or similar heat/energy dissipation components/techniques. Thus, the drawn power/current by the wire feeder 120 should in an amount that can be dissipated by the wire feeder 120. That is, the amount of power to be dissipated in any given message (total current & voltage over the duration of the message) should be at an amount that can be dissipated without overheating any components. In exemplary embodiments of the present invention, the average power of the data signal does not exceed 25 watts. In further exemplary embodiments, the average power of the current draw data signal is in the range of 5 to 25 watts. In a further exemplary embodiments, the average power is in the range of 7 to 20 watts. Of course, so long as a wire feeder 120 is capable of dissipating more heat energy/power the average power of the current draw signal can be higher than that discussed above.

To aid in dissipating the power (via generated heat) in the communication module 121, the wire feeder 120 can utilize an existing cooling fan (not shown) to cool any resister components used to dissipate the energy. In other exemplary embodiments, a dedicated cooling mechanism, such as a secondary fan, heat sink, etc. (not shown) can be used to cool the current sink circuit 127 during communication to properly dissipate any generated heat due to power dissipation. In further exemplary embodiments, a temperature monitoring circuit (not shown) can be used to monitor the temperature of the circuit 127, or some of its components. Such temperature monitoring circuits/systems are generally know. By monitoring the temperature the system controller can implement certain protocols to control the heat of the circuit 127. For example, in some exemplary embodiments the controller can use the detected heat—as compared to a predetermined heat threshold level—to cause an auxiliary cooling fan to be turned on to aid in cooling the desired components. In further exemplary embodiments, the controller can use the detected heat to stop the communication process, or alter the communication process to ensure a heat threshold level is not exceeded. For example, in some embodiments, an information packet can be sent to the power supply to indicate that communication will stop for a time, and then the wire feeder controller can monitor temperature until such time as the temperature is acceptable and begin communicating again. In other exemplary embodiments, the controller can change the current draw pulses to reduce the needed energy absorption. For example, the controller can cause the circuit 127 to reduce the peak current levels of the pulses so that less energy is absorbed until the temperature reaches an acceptable level and then the original pulse peaks can be used. Of course, the power supply 110 should be configured to recognize these secondary pulse configurations as well. The change of the pulse parameters can be communicated from the wire feeder 120 to the power supply 110 prior to the change so that the power supply 110 is appropriately configured to recognize the changed pulses. In a further exemplary embodiment, the controller of the wire feeder 120 has at least two predetermined temperature thresholds levels. When a first heat level is detected the controller determines that the communication must be stopped, additional cooling is needed, and/or the communications must be changed so that the heat level is reduced. The second level is lower than the first level and when the second level is detected the controller then determines that normal communications can be resumed. This can allow the heat to sufficiently reduce before normal operations are started again. It can be beneficial to have this second level sufficiently low such that once normal communications are resumed the first level is not reached quickly.

As stated above, the power supply 110 uses the current sense circuit 104 and receiver 105 to recognize the current draw pulses 201, 203 and 205 and use those pulses to control the operation of the power supply 110 consistent with the instructions from the wire feeder 120. The power supply 110 uses this information to adjust its waveform, output settings etc. to execute the desired welding operation.

Turning now to the communication from the power supply 110 to the wire feeder 120, as similar communication protocol is used, except that voltage pulses are used, as opposed to current pulses. That is, in exemplary embodiments of the present invention, the power supply 110 uses voltage pulses, within the supplied OCV voltage, to send acknowledgments and/or other data to the wire feeder 120. For example, in some embodiments, the control module 101 can be configured to send an acknowledgment signal to the wire feeder 120 to indicate that the data packet sent by the wire feeder 120 has been received. In such an embodiment, the wire feeder 120 can send a data packet (via the current draw pulses), and when is received by the power supply 110, the power supply sends an acknowledgment pulse and/or message, and when that acknowledgment is received by the wire feeder 110 it can send another data packet. In some embodiments, if no acknowledgment is received by the wire feeder 110, it resends the data packet. Of course, other data can be sent to the wire feeder 120 via the following methodology as well. In exemplary embodiments, the power supply 110 uses the transmitter 107 to provide a voltage pulse signal to the output power module 103. The output power module 103 uses the voltage pulse signal to control its output and provide voltage pulses, consistent with a predetermined communication protocol, to the wire feeder 120 via the power cables 130. The control of the output power module is well known and need not be described in detail herein.

Figure 3:
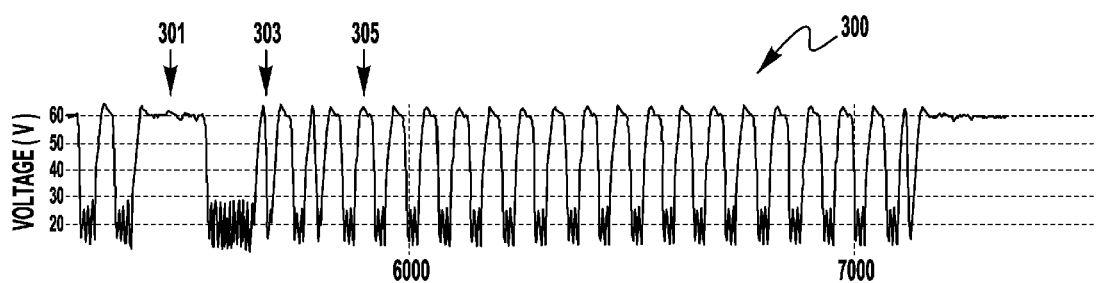
FIG. 3 illustrates a diagrammatical representation of an exemplary voltage signal communication waveform to be used by an exemplary embodiment of the present invention.

An exemplary embodiment of a voltage communication waveform 300 is shown in FIG. 3. As shown in this Figure, a similar communication methodology is employed as described with respect to FIG. 2, except rather than using current draw pulses, voltage pulses are employed. That is, as the power supply 110 is providing an OCV voltage to the wire feeder (e.g., prior to or after welding), the power supply 110 also provides voltage pulses 301, 303, and 305 to communicate information to the wire feeder. The pulses are sensed by the voltage sense lead 128 which couples the wire feeder 110 stud 113 to the receiver 129. These voltage pulses are sensed and converted to an informational signal to be used by the controller 121 of the wire feeder.

Turning now to FIG. 3, similar to the protocol discussed above, the power supply 110 can output a message start voltage pulse 301 which indicates to the wire feeder 110 that a message follows. The first pulse 301 can have a particular set of parameters, such has pulse width, voltage level, voltage level duration and/or frequency which is recognized by the wire feeder 120 as the beginning of a data message. Similar to FIG. 2, following the message start voltage pulse 301 are a series of data voltage pulses 303 305 which are different from each other so as to communicate a binary message to the wire feeder 110.

As shown in the example of FIG. 3, the OCV signal from the power supply 110 has an OCV voltage of 60 volts. The voltage pulses 301, 303, 305 each drop to about 20 volts, for a predetermined duration, and this voltage drop is detected by the receiver 129 and the controller 121 uses the received pulses to control an operation of the wire feeder 110 consistent with the received message/confirmation. As shown, 303 is a first data pulse type having a first pulse width, and pulse 305 is a second data pulse type having a second pulse width. In the embodiment shown, the voltage level of each of the pulse types are the same (in the embodiment shown, the pulse voltage is about 20 volts). Of course, in other exemplary embodiments the different pulse types can have different voltage levels and/or frequencies. For example, rather than changing the pulse widths of the pulses (as shown in FIG. 3), the pulses can have the same pulse width but different voltage levels—e.g., pulses 303 have a level of 20 volts and pulses 305 have a level of 40 volts. Of course, in other embodiments, other pulse parameters can be changed, so long as the pulses 303/305 are distinguishable from each other and can be recognized as distinct pulses by the wire feeder 120.

As shown in FIG. 3, the voltage pulses from the power supply 110 to the wire feeder 120 are made in the OCV voltage signal from the power supply 110 and have a voltage of about 20 volts, whereas the pulse widths of the different pulses are different. Of course, this embodiment is intended to be exemplary and in other exemplary embodiments, the voltage level of the pulses can be in the range of 1 to 70 volts so long as the pulses are recognizable as data pulses, while in other embodiments, the voltage can be in the range of 10 to 55 volts. Of course, the voltage level of the pulses 301, 303 and 305 can be a function of the OCV voltage level for the power signal provided to the wire feeder 120 from the power supply 110 when no welding operation is ongoing. In some exemplary embodiments, the voltage level for pulses is in the range of 20 to 95% of the OCV voltage level of the non-welding power signal. In other exemplary embodiments, the voltage level is in the range of 30 to 90% of the OCV voltage level, and in further embodiments the voltage level is in the range of 33 to 75% of the OCV voltage level. Of course, it should be noted that the voltage level of the pulses can be at any level appropriate for a given system so long as the voltage level of the pulse is sufficiently recognizable by the receiver in the wire feeder so as to ensure that the sent data is accurately and reliably received. In exemplary embodiments, the OCV voltage pulse signal can have a frequency in the range of 100 Hz to 10 KHz. In further exemplary embodiments, the frequency of the signal can be in the range of 1 to 5 KHz. In other exemplary embodiments, the frequency is in the range of 100 Hz to 1 KHz. Further, similar to the current draw signal method, any number of different voltage pulse types can be used to communicate data, where the voltage pulses have different peaks and/or widths to distinguish the pulses so long as they are recognizable by the wire feeder. Further, the pulse period or frequency can be used to differentiate pulse for data transmission.

It is noted that in some exemplary embodiments, the voltage for the signal pulses can drop to as low as 0 volts. However, in such embodiments the signal duration should not be too long so as to compromise the power being supplied to the wire feeder 110 to affect its operation.

The above methodologies described exemplary embodiments of communication between a wire feeder and power supply of a welding system in which the standard OCV power signal from the power supply to the wire feeder is used as a means to communicate between the components without the need for complex communication protocols. That is, in exemplary embodiments, the wire feeder uses a varied current draw on the OCV signal, whereas the power supply inserts voltage pulses within the OCV signal to facilitate communication. As explained herein, embodiments of the present invention can use at least two different current draw/voltage pulses to communicate data between the welding system components, where the different pulses have at least one characteristic that is different. That is, the pulses can differ in at least one of pulse width, frequency, peak duration, and/or peak magnitude, so long as the difference is sufficient to allow the respective receivers to distinguish between the pulses for accurate data transmission. Of course, in other embodiments, any combination of these pulse characteristics can also be used to distinguish the data pulses. For example, a first data pulse can have a first pulse width and peak, and the second type of data pulse can have a different pulse width and peak. Of course, other combinations can be used to differentiate the data pulses without departing from the spirit and scope of the exemplary embodiments described herein. This communication methodology is highly robust and reliable.

Further, because of the mode of communication there is no practical limit in the duration of messaging from the power supply 110 to the wire feeder 120, so long as the on time of the OCV signal is sufficient. However, there may be limitations in the overall duration of the messages from the wire feeder 120 to the power supply 110. Because the wire feeder 120 is drawing current from the OCV signal as the messaging protocol, that energy needs to be dissipated—as explained above, this can be done via heat dissipation. Thus, the messages from the wire feeder 120 should be of a length to ensure appropriate heat/energy dissipation by the wire feeder 120.

It should be noted that even though the above embodiments have been described as communicating when there is no welding signal being sent to the wire feeder 120 over the cables 130. In other exemplary embodiments of the present invention, the wire feeder 120 can communicate with the power supply 110 during welding using a similar communication protocol to that described above—current draw pulse. Of course, the current draw pulse messages from the wire feeder 120 to the power supply 110 are to be configured so as to not interfere with the welding operation and the welding waveform, communication can occur during welding. The current draw from a wire feeder motor (used for feeding the wire consumable) should also be considered to facilitate robust communication, as the current needed for the motor may change due to changes in torque requirements for the wire feeding. Therefore, in exemplary embodiments of the invention, where the wire feeder 120 communicates with the power supply during welding, the frequency of the current draw pulse message should be relatively low—so as to not interfere. For example, in exemplary embodiments, the frequency for the data signal should be in the range of 20 to 100 Hz. That is, to the extent that the message contains multiple frequencies (as explained above) each of the frequencies should be in the stated range. In other exemplary embodiments, the frequency should be in the range of 30 to 70 Hz. These relatively low frequencies can be used to ensure no interference with the welding operation during communication. Of course, in other embodiments, other frequencies can be used so long as no interference occurs, and can be dictated by the frequencies being used in the welding operation. Embodiments of the present invention can be used during all types of welding, including CC, CV, pulse, short arc, STT, etc., so long as the communication signal can be sufficiently distinguished from the welding signal and will not interfere with the welding signal.

It should be noted that in further exemplary embodiments, more than one wire feeder (load) can be connected to the power supply. In such embodiments, the data signal from the wire feeder includes wire feeder identification that is recognized by the power supply and is used to aid ensuring that the power supply is providing the proper output to the proper wire feeder. Thus, in some embodiments a power supply can be coupled to, and able to communicate with, more than one wire feeder using the methods discussed herein.

Figure 4:
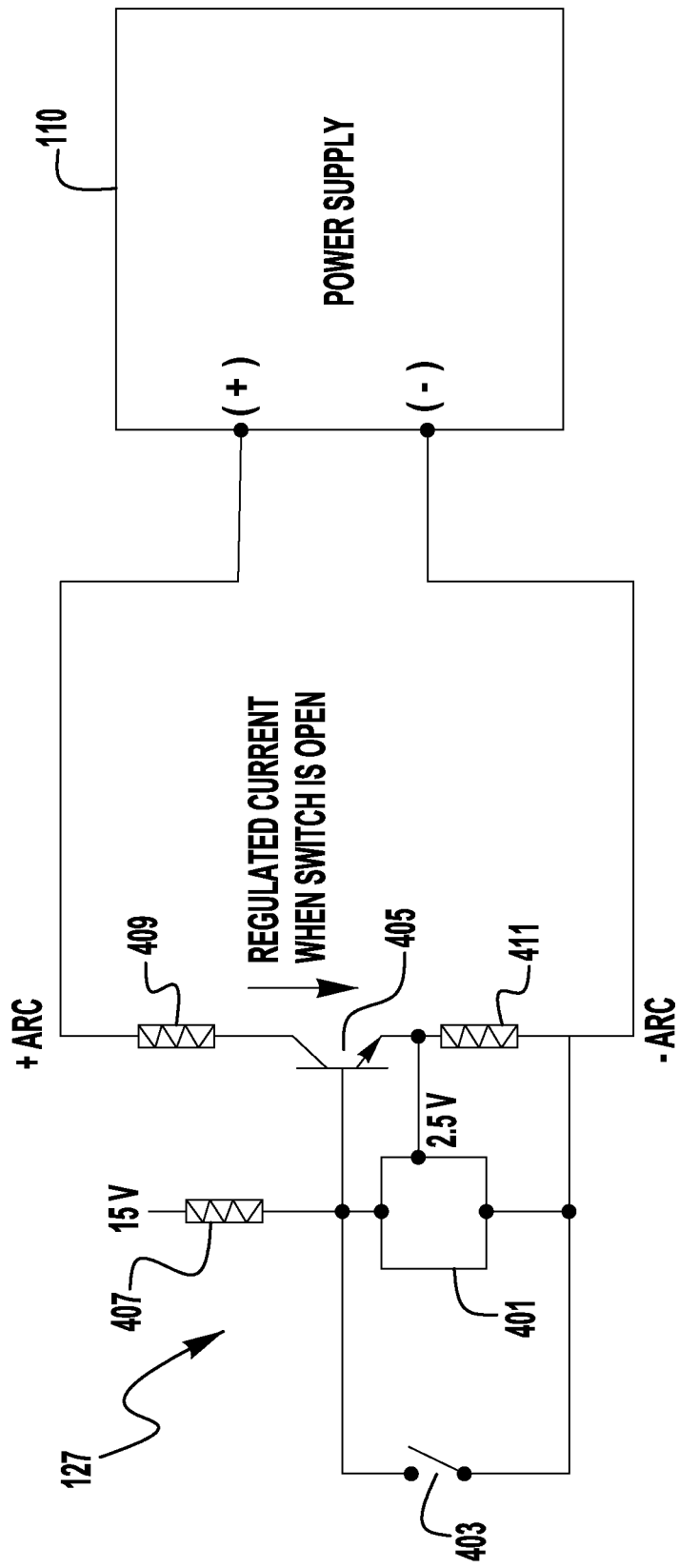
FIG. 4 illustrates a diagrammatical representation of an exemplary embodiment of a communication module in an exemplary wire feeder of the present invention.
Figure 5:
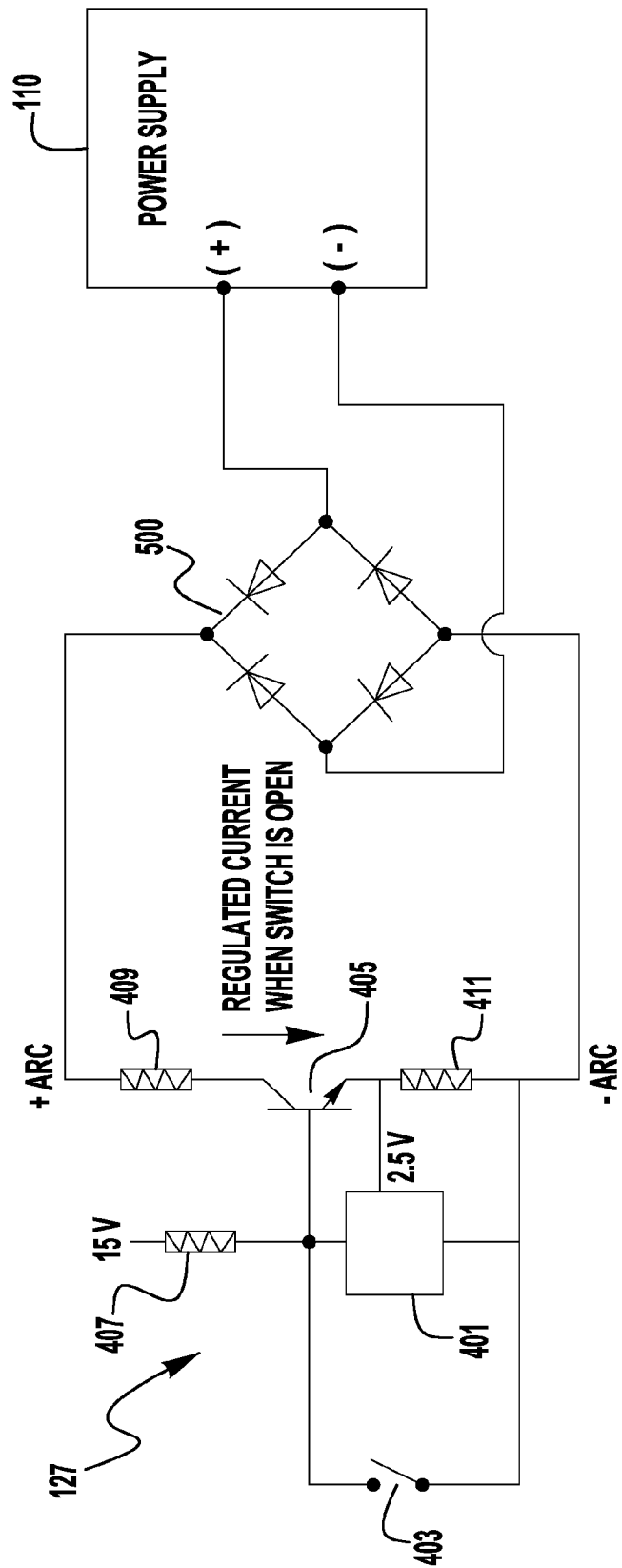
FIG. 5 illustrates a diagrammatical representation of a further exemplary embodiment of a communication module in an exemplary wire feeder of the present invention.

FIGS. 4 and 5 provide additional detail regarding exemplary embodiments of the current sink circuit 127. The depicted exemplary embodiments contain switches 403 and 405, resistors 407, 409 and 411, and a current shunt regulator 401 to regulate and absorb the current draw pulses during the messaging as described above. The current shunt regulator 401 can be any known such regulator so long as it is capable of performing as desired. An example of such a regulator is the TL431 three-terminal adjustable shunt regulator from Texas Instruments. Of course, other similarly functioning components can be used. For example, in some exemplary embodiments an op-amp, MOSFET combination can be used instead of the shunt regulator 401. Further, in additional embodiments the load resistor 409 can be switched in or out (using known switching circuitry) based on an input voltage to improve performance as needed. In the circuits shown in FIGS. 4 and 5, the resistor 409 provides a bulk of the energy dissipation during the generation of the current draw pulses in the wire feeder.

In the FIG. 5 embodiment, a full bridge rectifier 500 is added to the circuit so as to add connection flexibility to the output studs of the power supply 110. That is, with the use of the rectifier 500, the flexibility of the connections to the positive and negative terminals of the power supply 110 is increased. Of course, it is understood that other exemplary circuits can be used to accomplish the same functions as described above, and these circuits can be used without departing from the spirit or scope of the inventions described herein.

Because of the attributes and configurations discussed above, exemplary systems of the present invention can provide significant advantages over known welding systems. That is, using embodiments of the present invention, the wire feeder and power supply can communicate with each other without separate communication cables and do so with increased robustness and utility of the welding system. Further, this communication and data transmission occurs without adversely affecting the welding signal or welding operation, even though the data is being transmitted over the same welding cables as the welding signal.

As stated above, each of the wire feeder 120 and the power supply 110 use a controller which can employ a computer or microprocessor type system which executes various programs to facilitate the communications protocols described herein. A computer program (e.g., a computer program system) can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Turning now to further exemplary embodiments which provide a system and method of comprising receiving continuously worksite voltage measurement data of voltage at a welding electrode, where the worksite voltage measurement data is communicated across the arc using a welding cable and comparing continuously the worksite voltage measurement data to a welding output voltage at the welding power supply to identify a voltage difference. The communication methodology can be those described above. The method also includes increasing or decreasing the welding output voltage using the welding power supply based at least in part on the voltage difference.

Further embodiments provide a welding system comprising a wire feeder having a workpiece lead connection and a weld cable connection, the weld cable connection configured to operatively couple the wire feeder to a power supply, the workpiece lead connection configured to complete a circuit between the wire feeder and a workpiece. The system further includes a worksite voltage measuring component operatively coupled with the wire feeder, the worksite voltage measuring component continuously determines a worksite voltage measurement. In such embodiments the wire feeder is configured to receive the worksite voltage measurement, and the wire feeder is configured to transmit the worksite voltage measurement data through at least one of the weld cable connection and the workpiece lead connection.

As explained above, various types of communication can occur between the system components, including relaying information related to a welding operation, such as voltage and current detections across the arc, and other aspects of a welding operation, including cable impedance changes, etc.

As stated above, embodiments of the present invention can be used to in "across the arc" welding arrangements. Like embodiments described above, across the arc arrangements are such that one pair of cables run from the power supply to the workpiece to provide both power and communication, with one connected to the workpiece and the other unattached awaiting the wire feeder. The wire feeder is plugged in, with its own lead that clamps to the workpiece, and communicates over the work lead with the distant power supply without the use of additional control cables. Across the arc arrangements reduce the complexity, weight, accessory expense, and possible points of failure for welding systems.

Various practical characteristics of a welding system can impact the performance of a welding system and these characteristics and data and can sent via the communication protocols described herein. When seeking to weld in a particular manner or improve weld quality, weld settings associated with particular welding waveforms can be selected and communicated. In accordance with such waveforms and other welding parameters, a welding power supply powers the welding operation. However, the parameters are based on expected or ideal conditions.

In some situations. a deviation from expected or ideal conditions in "Across the Arc" and other welding system arrangements is that cable impedance can cause a voltage drop between the power supply and the wire feeder, such that the power supply output voltage is set to the requirement of the wire feeder but the wire feeder power input is not actually receiving the prescribed voltage. The voltage drop due to the impedance varies depending on the length and composition of the cable(s), geometry of the cables (coiled versus extended), welding current supplied, welding waveform and weld parameters, and other factors. Thus, a simple voltage offset at the power supply will not consistently compensate for discrepancies from an expected output at the welding tool, because such discrepancies can be dynamic in nature.

To monitor this variable discrepancy, an electrical measuring device (including, but not limited to, a voltmeter, multimeter, or other device or component) can be placed at or integrated into the wire feeder to determine the voltage at the wire feeder. This voltage can be transmitted back to the power supply (or another device in communication with the power supply) across the arc and compared to the expected/ welding voltage or via the communication protocols described herein. Such comparison can be conducted continuously and in real-time. The power supply operation parameters can then be adjusted to ensure the precise appropriate voltage (or other parameter) is provided to the wire feeder. In some embodiments, this is a repeated feedback processes which determines average voltage drop over a period of time until the average drop is based on sufficient data to substantially equal (in magnitude) the average voltage drop as opposed to continuously adjusting according to an instantaneous or most-recently-detected voltage drop.

Communication in embodiments disclosed herein can occur via the methodologies described herein. This provides simple communication as additional control wires can be cumbersome in many environments, and wireless communication is not always feasible (e.g., in shipyards where line-of-sight is a problem or multiple power supplies may be present requiring pairing between different wireless devices before use). This arrangement minimizes the number of wired connections while providing plug-and-play capability for wire feeders.

Figure 6:
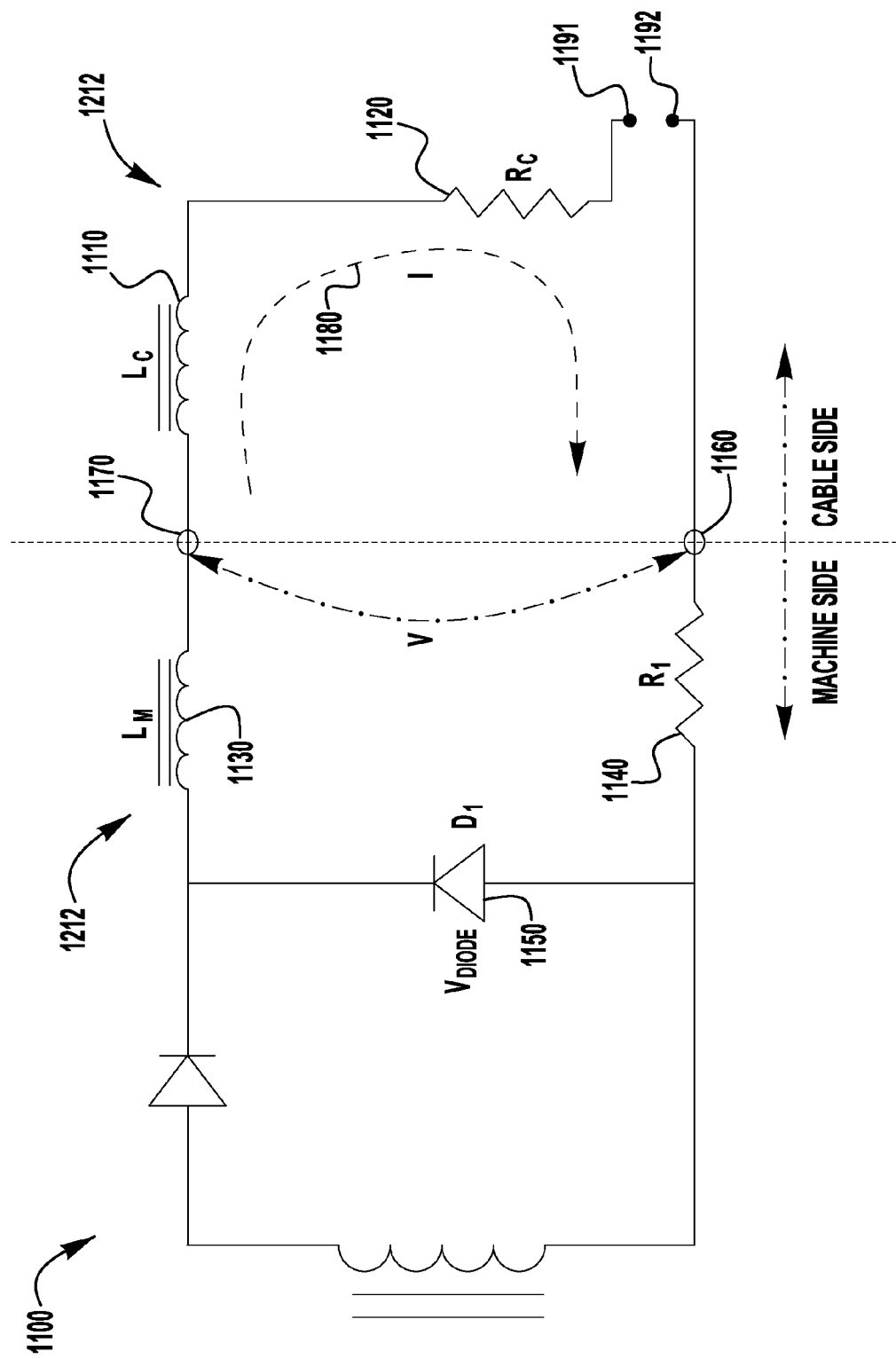
FIG. 6 illustrates a diagrammatical representation of another of an exemplary circuit representation of a welding output circuit path of at least FIG. 7, in accordance with an embodiment of the present innovation.
Figure 7:
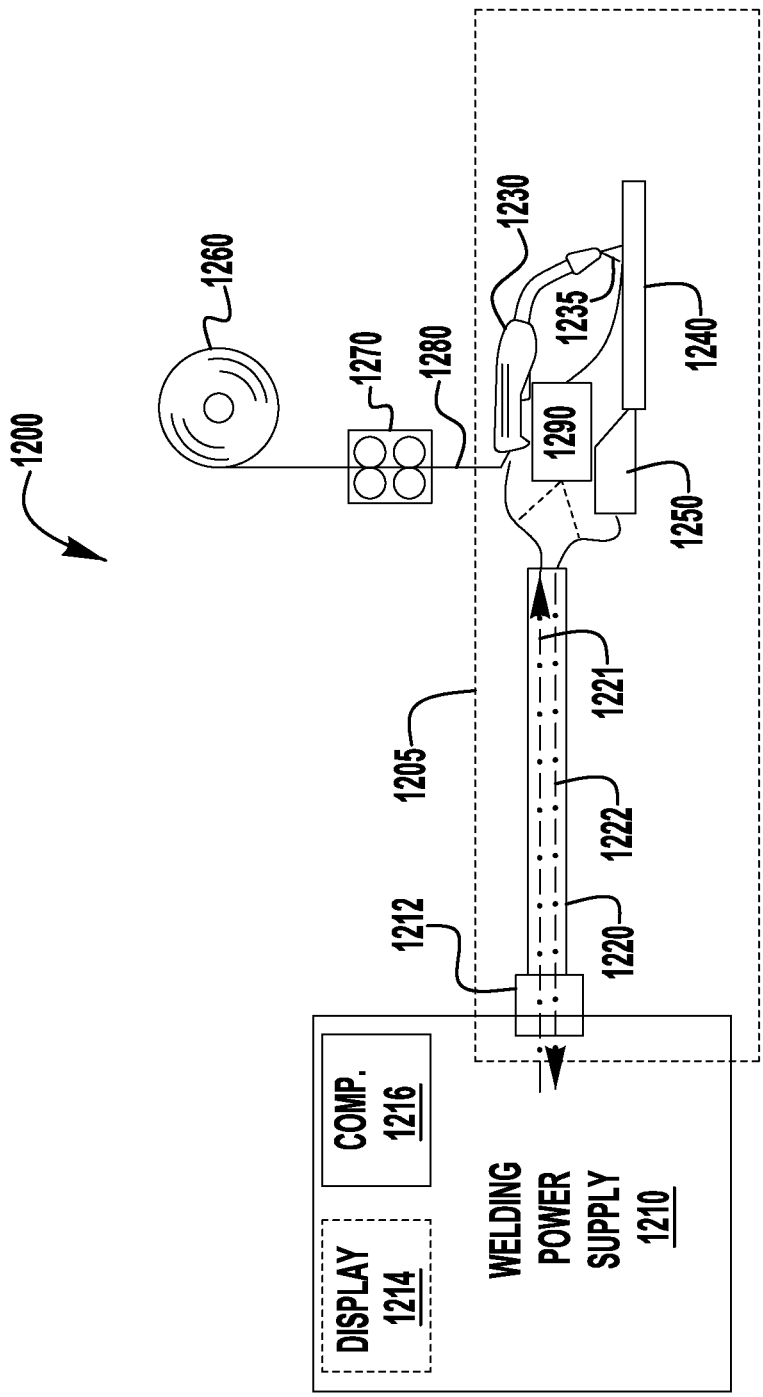
FIG. 7 illustrates a diagrammatical representation of a schematic block diagram of another exemplary embodiment of a welding system including a welding output circuit path.

FIG. 6 is an example circuit representation 1100 of a welding output circuit path, such as that illustrated at 1205 of FIG. 7 and other drawings, in accordance with an embodiment of the present innovation. The circuit representation 1100 includes an inductance Lc 1110 and a resistance Rc 1120 of the welding cable 1220 side of the welding output circuit path 1205. These values can (but need not exclusively) be defined by the characteristics of welding cable 1220. The circuit representation 1100 also includes an inductance Lm 1130, an internal resistance Ri 1140, and a diode D1 1150 of the welding power supply 1210 side of the welding output circuit path 1205. These values can (but need not exclusively) be defined by the characteristics of the welding power supply 1210, alone or in conjunction with wire feeder 1270 (e.g., the machine side). The welding cable 1220 connects to the welding power supply 1210 at the welding output 1212 having electrical nodes 1160 and 1170, and a workpiece can be located in the vicinity of welding output terminals 1191 and 1192.

When a current (I) 1180 flows through the welding output circuit path 1205, an output voltage (V) 1165 is produced between the nodes 1160 and 1170. Impedance from a power supply can be predetermined (e.g., due to the machine output choke and dependent on current), but external impedances from outside the power supply (or other externalities) cannot be known or forecast at the power supply in all circumstances. Because at least characteristics of welding cable 1220 are not static—the orientation and/or serviceability of welding cable 1220 change with time, and furthermore, different cables (having different, e.g., lengths, diameters, wear and tear, and other qualities) can be used with the same welding power supply 1210. Thus, the total impedance of the system changes with time based on cables.

The varying impedance can cause voltage discrepancies at various points in the system, to include differences between the expected and actual voltage at the welding electrode or workpiece. Various techniques of determining voltage discrepancies are described herein. In some (but not necessarily all) embodiments, power supplies, wire feeders, tools, or independent electrical feedback devices can determine a discrepancy between an actual electrical characteristic and the expected characteristic based on power supply settings and the overall welding system. In one or more specific embodiments, wire feeders include voltage feedback capabilities for determining a voltage error or discrepancy caused by welding cable impedance, determining the difference between the expected voltage at the measurement site (e.g., at the workpiece, from the power supply, other values) and the actual voltage at the measurement site (e.g., actual voltage at workpiece, actual voltage in welding tool, actual voltage detected by wire feeder, and others).

Electrical measurements (e.g., a voltage measurement at a wire feeder or welding tool) can be transmitted across the arc, thereby eliminating the need for separate control wires or complex wireless communication techniques. Connecting welding cables into the system will enable communication using such welding cables and enable feedback related to at least the electrical measurements. This is beneficial in many welding arrangements, including those (such as Surface Tension Transfer) which can optionally use separate sensor and/or control leads in addition to welding cables. Across the arc techniques allow for an improvement in performance while reducing the total system complexity as well as eliminating sources of error and points of failure.

Turning to such an embodiment, FIG. 7 illustrates a schematic block diagram of an example embodiment of a welding system 1200 including a welding output circuit path 1205, in accordance with various aspects of the present innovation. The welding system 1200 includes a welding power supply 1210 having a welding output 1212, a comparator component 1216, and, optionally, a display 1214. The welding output circuit path 1205 is connected to the welding power supply 1210 at the welding output 1212.

In accordance with an embodiment, the welding output circuit path 1205 includes a welding cable 1220, a welding tool 1230, a workpiece connector 1250, a spool of welding wire 1260, a welding wire feeder 1270, a welding wire 1280, welding electrical measurement component 1290, and an optional workpiece 1240. Welding cable 1220 includes leads for connections to welding tools and/or an optional workpiece 1240.

During operation, the welding wire 1280 is fed into the welding tool 1230 from the spool of welding wire 1260 via the wire feeder 1270, in accordance with an embodiment. In accordance with another embodiment, the welding system 1200 does not include a spool of wire 1260, a wire feeder 1270, or a welding wire 1280 but, instead, includes a welding tool comprising a consumable electrode such as is used in, for example, stick welding. In accordance with various embodiments of the present innovation, the welding tool 1230 may include at least one of a welding torch, a welding gun, an electrode holder, and a welding consumable.

The welding output circuit path 1205 runs from the welding output 1212 of the welding power supply 1210 through the welding cable 1220 to the welding tool 1230, through the workpiece 1240 and/or to the workpiece connector 1250, and back through the welding cable 1220 to the welding power supply 1210. During operation, the welding power supply 1210 may apply a welding output waveform to the welding output circuit path 1205, causing a time-varying electrical current to run through the welding output circuit path 1205 and creating an arc between the wire (or electrode) and the workpiece 1240. In accordance with an embodiment of the present innovation, the welding cable 1220 comprises a coaxial cable assembly. In accordance with another embodiment of the present innovation, the welding cable 1220 comprises a first cable length running from the welding power supply 1210 to the welding tool 1230, and a second cable length running from the workpiece connector 1250 to the welding power supply 1210.

One portion of data capable of being transmitted over the welding cable 1220 are electrical measurements from electrical measurement component 1290. Electrical measurement component 1290 can measure an electrical variable value at the worksite at or on an optional workpiece 1240, at or near wire feeder 1270, or elsewhere. In an embodiment, electrical measurement component 1290 takes one or more voltage measurements (e.g., at the workpiece, at another location) and transmits the voltage values back to welding power supply 1210 by transmitting through welding cable 1220. While electrical measurement component 1290 is shown as being in the vicinity of welding tool 1230, electrical measurement component 1290 can be standalone or integrated into various other components (e.g., within wire feeder 1270).

Comparator component 1216 (or other components of welding power supply 1210) can compare values measured by electrical measurement component 1290 to those expected based on output at welding output 1212. Based on this comparison, comparator component 1216 can calculate an electrical signal discrepancy between the expected and actual electrical measurements. In an embodiment, the discrepancy is a voltage difference. Based on the voltage difference, welding power supply 1210 can increase or decrease welding output voltage to compensate for the voltage difference due to, e.g., cable inductance and other system characteristics.

Figure 8:
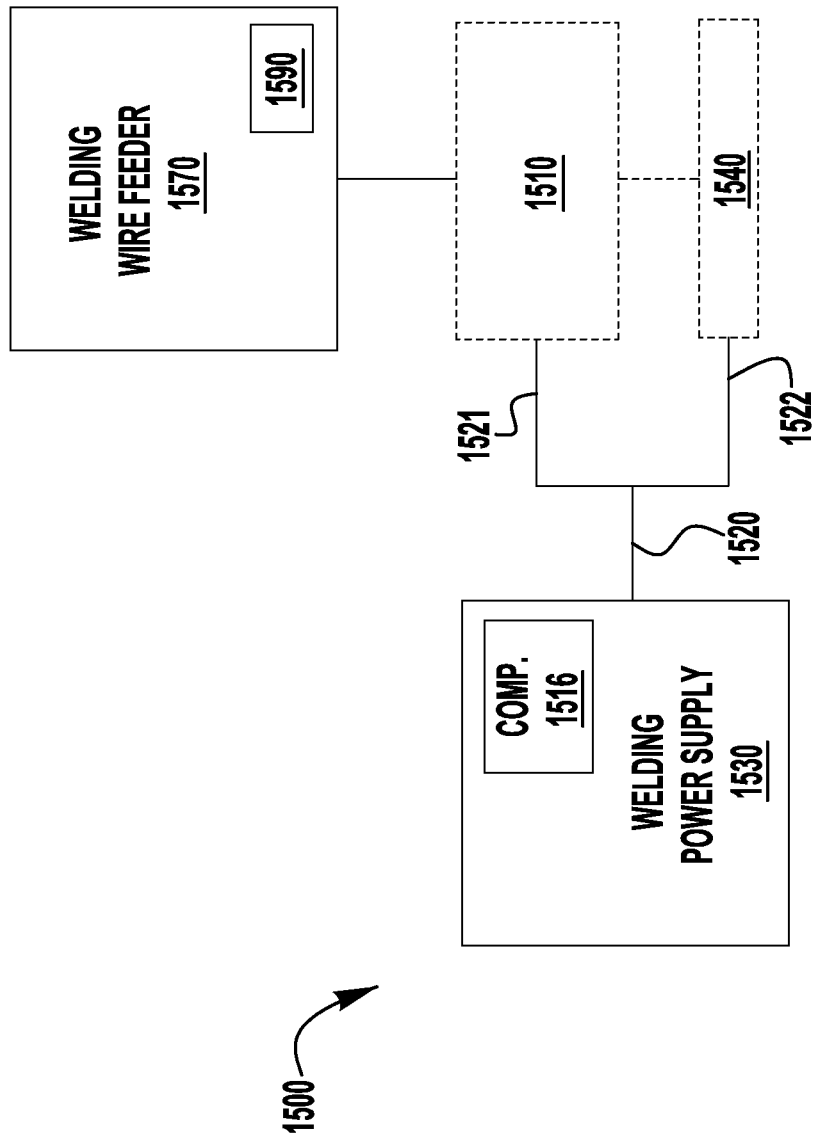
FIG. 8 illustrates a diagrammatical representation of another schematic block diagram of a further exemplary embodiment of a welding system including a welding output circuit path.

FIG. 8 depicts an alternative embodiment of a welding system 1500 using techniques described herein. Welding system 1500 includes welding wire feeder 1570, welding cable 1520, welding tool lead 1521, and workpiece lead 1522. Welding system 1500 can also optionally include welding power supply 1530, welding tool 1510, and/or welding workpiece 1540. Power source 1530 includes a comparator component 1516 and is communicatively coupled with electrical measurement component 1590 at least via welding cable 1520. In this regard, communication can occur across the arc.

Electrical measurement component 1590 records an actual electrical measurement within the welding circuit and transmits the electrical measurement back to comparator component 1516 which analyzes the actual electrical measurement in view of an expected electrical value. Based on the difference in the actual and expected values, welding parameters can be modified. This can include transmitting a signal to power supply 1530 to increase or decrease a welding voltage provided through welding wire feeder 1570 based on a voltage discrepancy.

While welding system 1500 depicts welding wire feeder 1570 as the central component of the system with other elements optional, various combinations of elements depicted can be utilized without departing from the scope or spirit of the innovation. For example, welding wire feeder 1570 and welding power supply 1530 can be a combined unit. Further, while comparator component 1516 is shown as integrated within welding wire feeder, this component can be present in other elements in alternative embodiments, including power supply 1530, welding tool 1510, or electrical measurement component 1590. In at least one embodiment, an expected voltage value is transmitted using welding cable 1520 to permit comparator component 1516 to complete comparison of a measured value at a location outside welding wire feeder 1570 (and/or welding power supply 1530). Furthermore, each of the wire feeder and/or the power source can have a user interface to allow a user to interact with the system and components and input data and parameters and read information and parameters.

Figure 9:
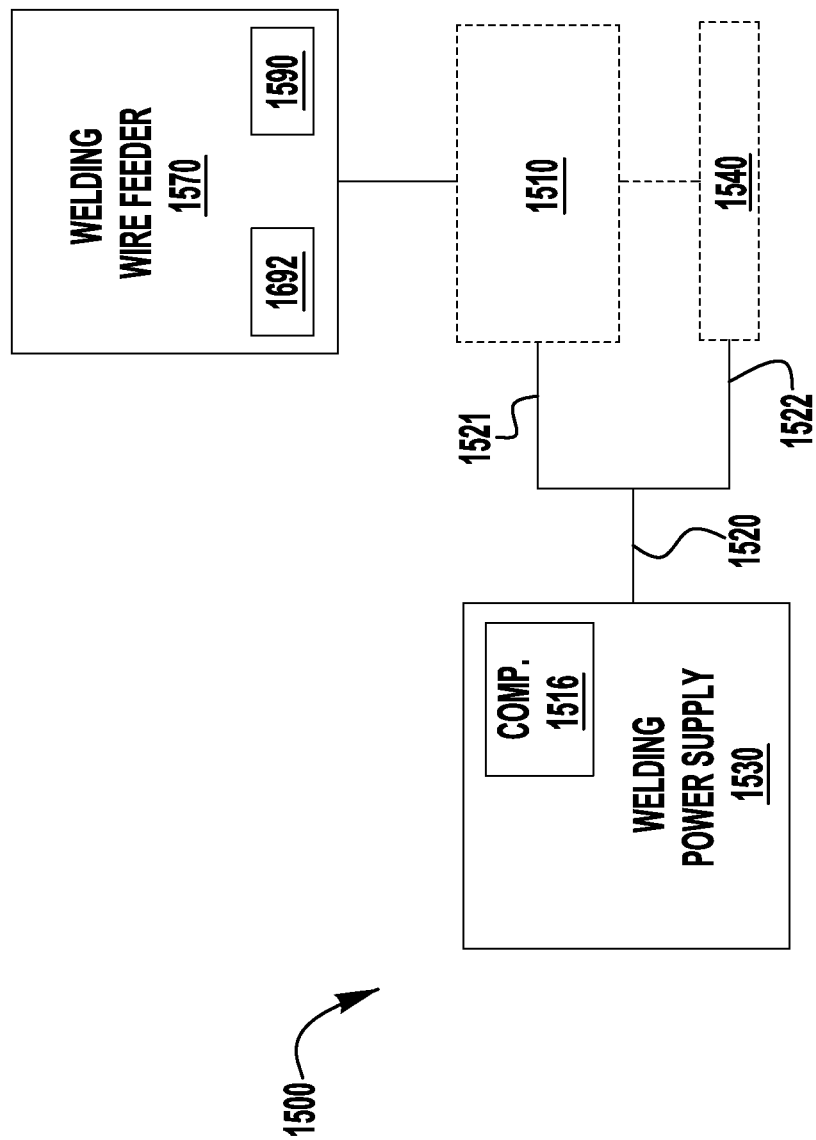
FIG. 9 illustrates a diagrammatical representation of a schematic block diagram of an additional exemplary embodiment of a welding system including a welding output circuit path.

FIG. 9 illustrates a further embodiment similar to that of FIG. 8 wherein welding system 1600 includes an electrical characteristic signal processor 1692. In embodiments, electrical characteristic signal processor 1692 can be a voltage signal processor. Electrical characteristic signal processor 1692 can transform a measured electrical characteristic (e.g., from electrical measurement component 1590) into another format. In embodiments, electrical characteristic signal processor 1692 transforms a measured electrical characteristic into a compressed size signal to reduce the bandwidth required by its transmission. In an embodiment, electrical characteristic signal processor 1692 creates a compressed size voltage data to transmit a voltage value for comparison. In alternative or complementary embodiments, electrical characteristic signal processor 1692 can change the format of a measured electrical characteristic to include encoding, encrypting, or re-formatting.

Modification of a measured electrical characteristic can enable expanded use of across the arc communication. In an example, surface tension transfer and other short-arc welding processes can include sense leads to provide information back to the power supply to perform the rapid calculations for control of these operations. Reliance on welding cable 1520 in lieu of sense leads may at times result in insufficient bandwidth to provide the realtime feedback required for control of complex processes. Incorporation of additional circuitry for measuring parameters and performing calculations at, e.g., wire feeder 1570 (and/or other components) can permit larger data portions to be received, processed, and analyzed therein, with smaller control signals conforming to the bandwidth available using welding cable 1520 sent back to power supply 1530 (and/or other components) which adjusts according to these smaller signals. This allows for more decisions or control steps to be performed at a lower bandwidth per decision or control step, increasing the speed of control. This can include converting an analog parameter signal such as voltage to a digital signal before provisioning to the power supply using the power cable.

In a specific embodiment, voltage over time can be measured realtime at wire feeder 1570. The wire feeder can include comparator component 1516, and either include or be operatively coupled with electrical measurement component 1590 and electrical characteristic signal processor 1692. One or more of these components can perform a calculation to produce a trigger including a compressed size signal comprising a smaller portion of information than would be required if all parameters were measured at wire feeder 1570 or (optional) workpiece 1540. The trigger is sent to power supply 1530 for use in calculations or adjustments. In embodiments, the trigger may be sent to alternative or additional components (e.g., welding wire feeder 1570, comparator component 1516, others) for use in calculations or adjustments. In another such embodiment, the instantaneous voltage or voltage difference is provided in realtime to welding wire feeder 1570 and/or power supply 1530 through the welding cable 1520. In embodiments, such as those described above, having the comparator in the wire feeder can allow the wire feeder to do a welding signal comparison and then send a set point (via the communications described herein) back to the wire feeder. For example, the comparator can be used to compare the detected welding voltage to a desired voltage set point (that was previously communicated to or set at the wire feeder) and then rather than sending the detected voltage to the power supply, the wire feeder does the comparison and sends a new voltage set point for the power supply. The power supply then changes its output power based on the new set point. Of course, other welding parameters such as current can also be changed in this way.

In an embodiment, control can be bifurcated into an "inner loop" and "outer loop," with inner loop control occurring at wire feeder 1570 and outer loop controls occurring at power supply 1530. For control that must be performed in real time, such as controlling the timing of surface tension transfer processes, the, high speed control is done by the wire feeder 1570. Less time-critical processes controls would be done by power supply 1530. The power supply control utilizes parameters and other data are sent back to power supply 1530 which uses onboard control circuitry for processing and responding to such therein. Information between wire feeder 1570 and power supply 1530 can be sent via welding cable 1520 in such embodiments.

In an embodiment, at least a portion of a control circuit for a power supply is moved to the wire feeder, and communicates with the power supply over the power cable. In an alternative or complementary embodiment, another high speed communication link can be included. For example, wire feeder and power supply could pair using the cable and thereafter communicate at least in part wirelessly. Alternative high speed communication links are also possible to use.

In accordance with other alternative embodiments, the various functional aspects of determining the electrical characteristics of a welding output circuit path and selecting a welding output waveform based on the electrical characteristics may be distributed between the welding power supply and the welding output analyzer in various ways, dependent on prudent design judgment, cost restrictions, and/or other considerations and tradeoffs.

Figure 10:
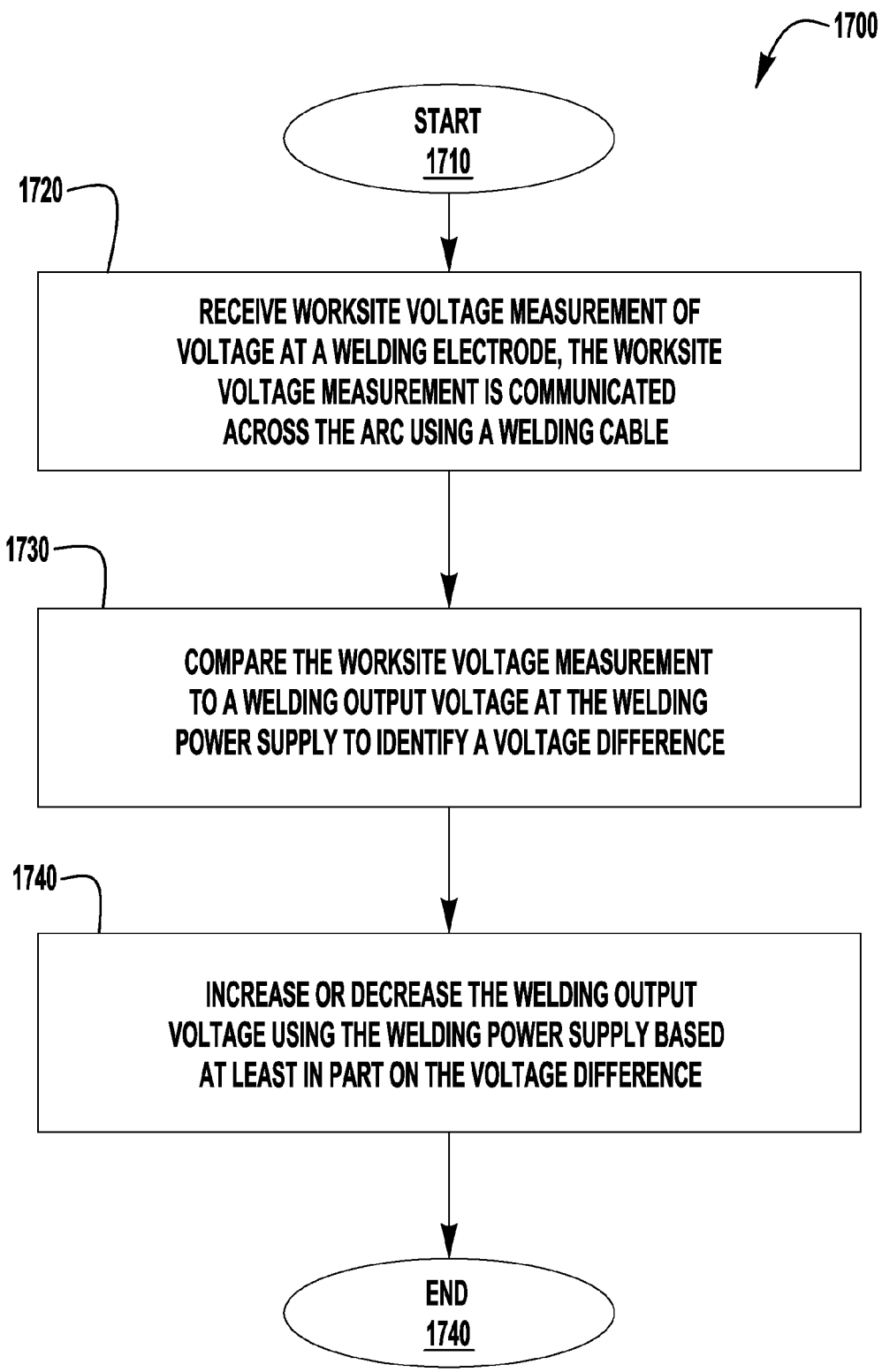
FIG. 10 illustrates a diagrammatical representation of a flowchart of an exemplary embodiment of a method for controlling a welding output electrical characteristic.

FIG. 10 is a flowchart of an example embodiment of a method 1700 for modifying an output electrical characteristic at a welding power supply. Method 1700 begins at 1710 and proceeds to 1720 where worksite voltage measurement data at a welding electrode (or nearby component) is received (by, e.g., a wire feeder, power supply, or other component including components for processing the information). Methodology 1700 then proceeds to 1730 to compare the worksite voltage measurement data to a welding output voltage at the welding power supply to identify a voltage difference. Thereafter at 1740, an increase or decrease the welding output voltage is applied using the welding power supply based at least in part on the voltage difference.

In further exemplary embodiments of the present invention, the wire feeder is capable of sending a trigger signal (for example, using communication protocols discussed above) to the power supply in response to detecting an event at the feeder. The trigger is a quick/short signal that is recognized at the power feeder as indicating that such a predetermined event has occurred. For example, in certain welding applications, such as STT, it is desirable to detect when the derivative or rate of change of the voltage (dv/dt) exceeds a predetermined value in a short circuit. This predetermined value can be representative of a critical event in the welding waveform, requiring a response from the power supply on the welding waveform. In known systems, to detect this type of voltage change remote sense leads are needed. However, in exemplary embodiments of the present invention, the remote sense leads are eliminated. That is, in exemplary embodiments, the wire feeder contains a detection circuit (such as a known voltage derivative detection circuit) which detects the type of predetermined event to be monitored for (for example the voltage derivative discussed above). Such detection circuits are known. When the event is detected via the detection circuit, the detection of the event is communicated via the "trigger" signal over the welding cables. In exemplary embodiments, the wire feeder uses the above described current draw modulation technique. The trigger event is recognized at the power supply as indicating that the event has occurred, and in exemplary embodiments, the power supply does not send a response back but responds to or otherwise changes its output signal/ power based on the trigger event being communicated. Thus, unlike some of the other embodiments described herein, rather than a full digital signal being sent via current draw pulses, a single predetermined event is signaled via the trigger communication and the power supply reacts to that trigger signal. In exemplary embodiments, the trigger signal is a single current pulse having predetermined properties, which would look like a step change in current to the power supply. For example, in some exemplary embodiments the trigger current draw pulse can have a peak current in the range of 2 to 10 amps, and in other embodiments can have a peak current in the range of 3 to 7 amps. Further, the current pulse can have a pulse width in the range of 0.25 to 3 ms, and in other embodiments, the pulse width is in the range of 0.5 to 1.5 ms. In such embodiments, the power source recognizes the trigger current pulse (instead of, for example, waiting to see the change in derivative voltage) to change its output. In other exemplary embodiments rather than a single pulse a plurality of pulses can be used, but again the overall signal is short so as to minimize reaction time by the power supply.

In exemplary embodiments, the trigger pulse can indicate different events depending on the welding operation being performed. That is, when a particular type of welding operation is selected (for example STT), the power supply then recognizes the trigger event to be representative of a particular type of dv/dt detection. However, in other welding operations, the trigger event can represent a different type of event, such as the measured voltage exceeding a peak value, etc. Thus, when the trigger event is detected at the wire feeder, the trigger pulse is sent to the power supply which is recognized and reacts consistent with it predetermined protocol. Of course, in such embodiments the wire feeder comprises the detection circuits, such as comparators, etc. which are capable of detecting and comparing a voltage, voltage derivative, current and/or current derivative as needed for the desired detection event. Such detection and comparison circuits are known and need not be described here in detail.

In summary, systems and methods for selecting a welding output based on measured electrical characteristics in a welding output circuit path are disclosed. A discrepancy or difference between expected and measured electrical values can be discerned and communicated across the arc to permit adjustment of at least a welding power source to compensate for the difference or discrepancy.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program, including the communication protocols discussed herein, include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user on the wire feeder and/or the power supply, the above described techniques can be implemented on a CNC or computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Comprise, include, and/or plural forms of each are open ended and include the listed parts and can include additional parts that are not listed. And/or is open ended and includes one or more of the listed parts and combinations of the listed parts.

As stated above, although the majority of the discussion in the present application has been discussed within the context of welding power supplies and wire feeders, these discussions were exemplary. In other words, while the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined herein.

We claim:

1. A welding system, comprising:
    a welding power source comprising a controller having a first receiver, a first transmitter and a current sense circuit;
    a wire feeder comprising a communication circuit having a second receiver, a second transmitter, a current sink circuit having a current shunt regulator and switches, and a voltage sense circuit; and
    at least one welding power cable coupled to each of said welding power source and said wire feeder which carries a welding power from said welding power source to said wire feeder during a welding operation;
    wherein said wire feeder communicates with said welding power source over said at least one welding power cable by the current sink circuit generating a current draw signal which is detected by said current sense circuit in said welding power source;
    wherein said welding power source communicates with said wire feeder over said at least one welding power cable by generating a voltage pulse signal which is detected by said voltage sense circuit in said wire feeder;
    wherein said current draw signal comprises a plurality of current draw pulses generated by said wire feeder and said voltage pulse signal comprises a plurality of voltage pulses; and
    wherein the current draw signal has a frequency in a range of 10 Hz to 10 kHz.

2. The welding system of claim 1, wherein said current draw signal comprises at least a first pulse type and a second pulse type, and said voltage pulse signal is sent to said wire feeder in response to said current draw signal.

3. The welding system of claim 1, wherein said current draw signal comprises a signal start current draw pulse having a predetermined peak and duration, which is recognized by said controller as the beginning of a communication signal; and said voltage pulse signal has a message start voltage pulse.

4. The welding system of claim 3, wherein said current draw signal comprises a signal end current draw pulse which is the same as said signal start current draw pulse, and said voltage pulse signal is sent to said wire feeder after said welding power source receives said signal end current draw pulse.

5. The welding system of claim 1, wherein said current draw signal comprises a first type of current draw pulses and a second type of current draw pulses, wherein said first type is different than said second type; and said voltage pulse signal has a first type of said voltage pulses and a second type of said voltage pulses.

6. The welding system of claim 5, wherein said first and second types of said current draw pulses have a same peak current level, and said first and second types of said voltage pulses have a same voltage level.

7. The welding system of claim 5, wherein said first and second types of said current draw pulses have a different pulse width, and said first and second types of said voltage pulses have a different pulse width.

8. The welding system of claim 1, wherein at least some of said current draw pulses have a peak current in the range of 0.25 to 5 amps, and a pulse width in the range of 0.05 to 100 ms, and wherein at least some of said voltage pulses have a peak voltage in the range of 1 to 70 volts.

9. The welding system of claim 1, wherein said current draw signal has a frequency in the range of 20 to 100 Hz during said welding operation, and in the range of 100 to 500 Hz when not during said welding operation.

10. The welding system of claim 1, wherein the wire feeder is configured to monitor a temperature of the current sink circuit and control said current draw signal based on the temperature of the current sink circuit.

11. The welding system of claim 10, wherein the wire feeder is configured to stop and restart the current draw signal based on the temperature of the current sink circuit.

12. The welding system of claim 11, wherein the current sink circuit comprises:
    a load resistor through which the current draw signal flows; and
    a full bridge rectifier located between the load resistor and the welding power source.

13. The welding system of claim 11, wherein the wire feeder is configured to determine a worksite welding voltage measurement and compare the worksite welding voltage measurement to a desired voltage set point, and communicate a new voltage set point to the welding power source based on a result of comparing the worksite welding voltage measurement to the desired voltage set point.

14. The welding system of claim 13, wherein the wire feeder is configured to detect a derivative (dv/dt) of the worksite welding voltage and communicate a trigger signal to the welding power source based on a value of the derivative (dv/dt) of the worksite welding voltage during a surface tension transfer welding process.

15. The welding system of claim 1, wherein the voltage pulse signal has a frequency in a range of 100 Hz to 10 kHz.

16. The welding system of claim 1, wherein the current draw signal has a frequency in a range of 100 Hz to 500 Hz.

17. The welding system of claim 16, wherein the voltage pulse signal has a frequency in a range of 100 Hz to 1 kHz.

18. The welding system of claim 1, wherein the current draw signal has a frequency in a range of 20 Hz to 100 Hz.

19. The welding system of claim 18, wherein the voltage pulse signal has a frequency in a range of 100 Hz to 1 kHz.

20. A welding system, comprising:
- a welding power source comprising a controller having a first receiver, a first transmitter and a current sense circuit;
- a wire feeder comprising a communication circuit having a second receiver, a second transmitter, a current sink circuit having a current shunt regulator and switches, and a voltage sense circuit; and
- at least one welding power cable coupled to each of said welding power source and said wire feeder which carries a welding power from said welding power source to said wire feeder during a welding operation;
- wherein said wire feeder communicates with said welding power source over said at least one welding power cable by the current sink circuit generating a current draw signal which is detected by said current sense circuit in said welding power source;
- wherein said welding power source communicates with said wire feeder over said at least one welding power cable by generating a voltage pulse signal which is detected by said voltage sense circuit in said wire feeder;
- wherein said current draw signal comprises a plurality of current draw pulses generated by said wire feeder and said voltage pulse signal comprises a plurality of voltage pulses; and
- wherein the wire feeder is configured to monitor a temperature of the current sink circuit and control the current draw signal based on the temperature of the current sink circuit.

* * * * *